Nov. 4, 1924.

C. W. DARROW 1,514,442

POWER TRANSMISSION MECHANISM

Filed April 28, 1924    2 Sheets-Sheet 1

Inventor:
Chester W. Darrow

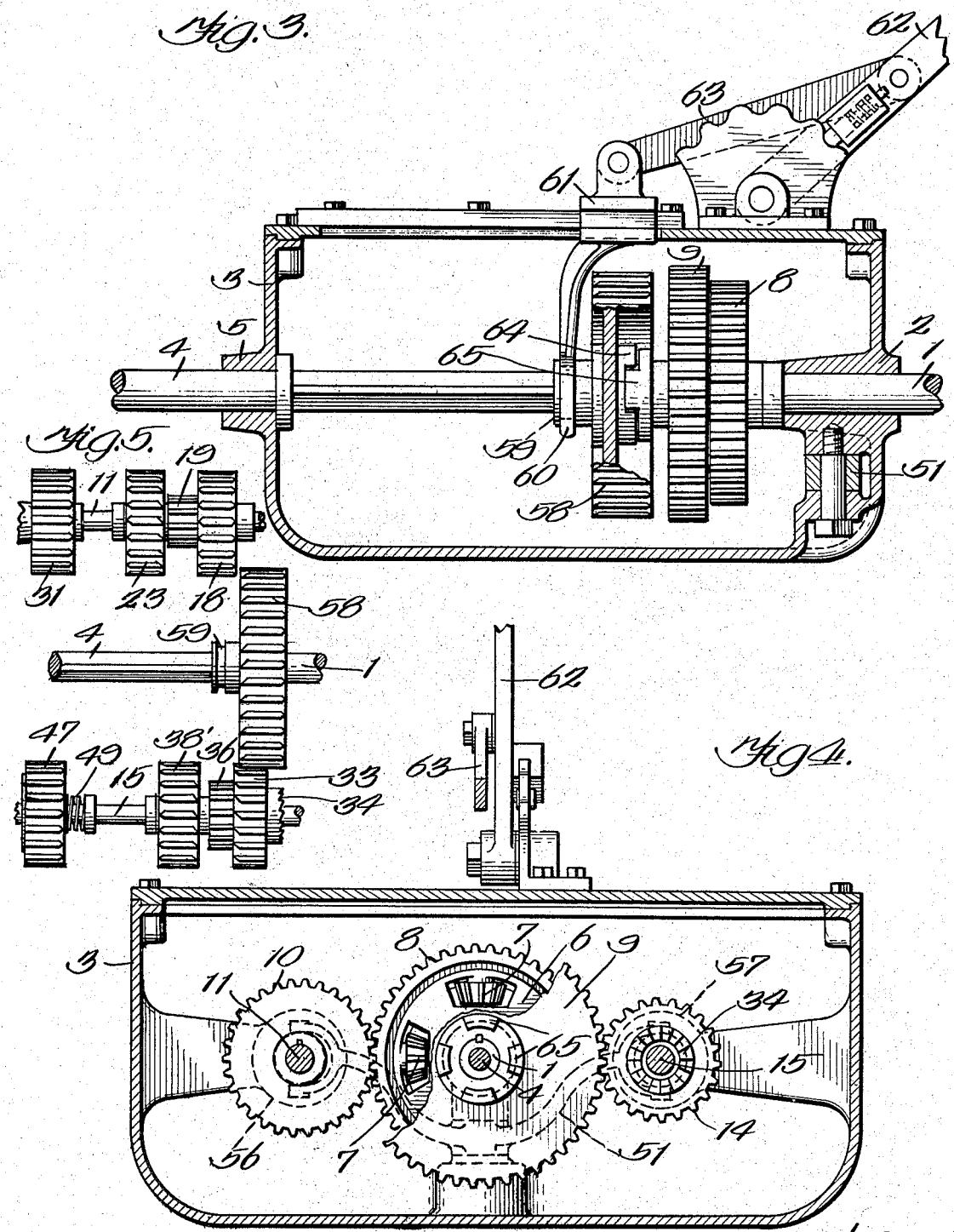

Patented Nov. 4, 1924.

1,514,442

UNITED STATES PATENT OFFICE.

CHESTER W. DARROW, OF CHICAGO, ILLINOIS.

POWER-TRANSMISSION MECHANISM.

Application filed April 28, 1924. Serial No. 709,570.

*To all whom it may concern:*

Be it known that I, CHESTER W. DARROW, a citizen of the United States, residing at Chicago, in the county of Cook and the State of Illinois, have invented a certain new and useful Improvement in Power-Transmission Mechanism, of which the following is a full, clear, concise, and exact description.

My invention relates to power transmission mechanism and has for its object the provision of improved means for adjusting the speed of operation of a load with respect to the prime mover in operating relation thereto. My invention is of particular utility in the power plant of an automobile, as by it I am enabled to effect, in a simplified manner, the shifting of the speed changing gearing through which the motor of such a plant drives the automobile.

In carrying out my invention in the preferred way the H-shaped guide for the gear shift lever is dispensed with, the gear shift lever being confined to a single straight line path in accomplishing the various shifts, an important advance in the art that is of especial advantage in the hands of a beginner. With the device of my invention it is unnecessary to throw out the clutch in changing gears, the danger of stripping the gears and stalling the motor being eliminated and which is apt to occur if the movements of the gear shift lever of the prior art are not effected in orderly sequence.

The invention will be fully explained in connection with the accompanying drawings, in which—

Fig. 3 is a sectional view on line 3—3 of Fig. 1;

Fig. 4 is a sectional view on line 4—4 of Fig. 1; and

Fig. 5 is a view, somewhat diagrammatic, of the gearing, showing the preferred shapes of the gear teeth in the various gear wheels.

Figure 1:
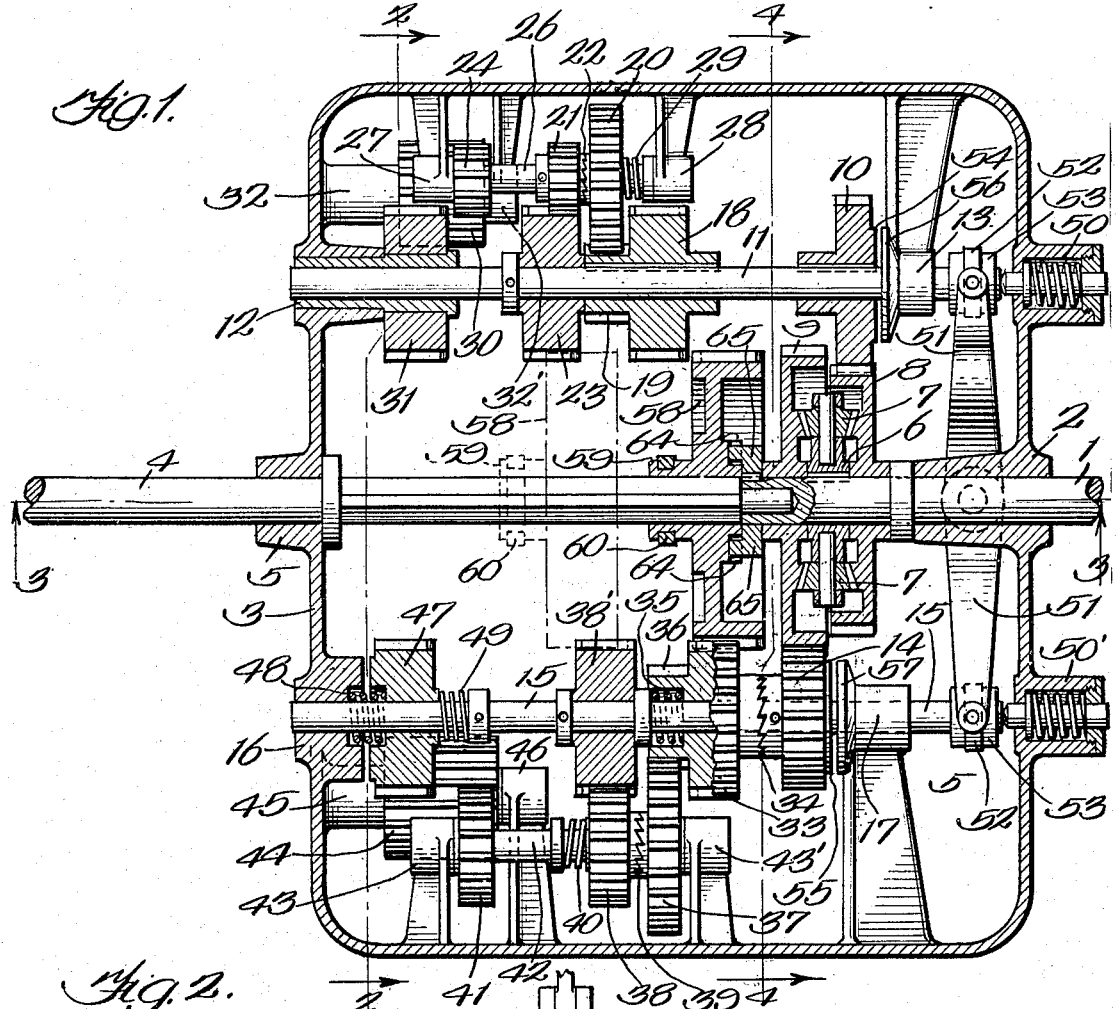
Fig. 1 is a longitudinal sectional view of the preferred form of speed changing gearing and gear shifting mechanism constructed in accordance with the preferred embodiment of this invention.
Figure 2:
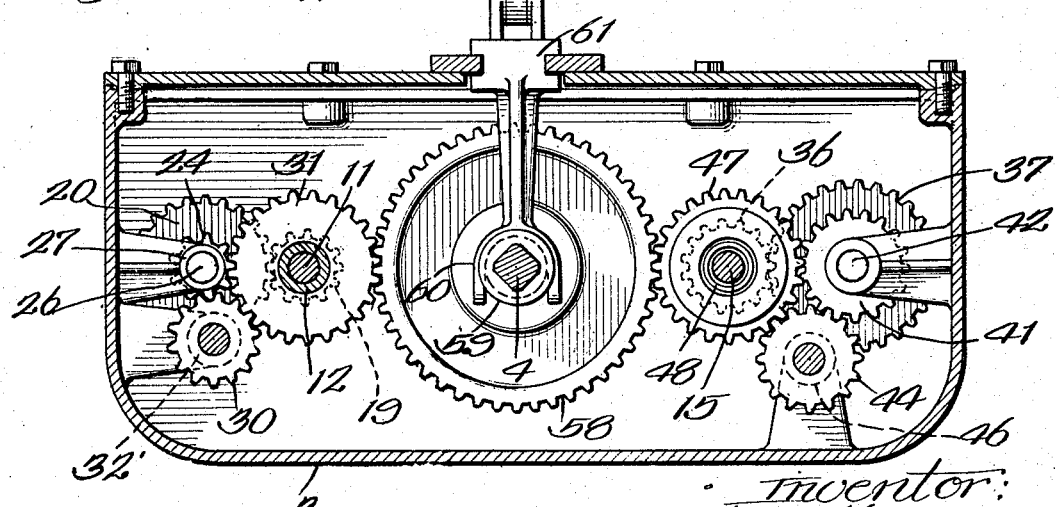
Fig. 2 is a sectional view on line 2—2 of Fig. 1.

The driving shaft 1 is connected with the engine or motor through any usual or suitable clutch. It has one bearing 2 in the gear case 3. The load shaft 4, that shaft in an automobile which leads to the differential gear that drives the rear, propelling, vehicle wheels, has a bearing 5 in said gear case. A spider 6 is keyed upon the driving shaft and on this spider are mounted the individually rotatable bevel pinions 7 of the differential gearing through which the driving shaft 1 turns the unequally diametered spur gear wheels 8 and 9 that are coaxial with and turn upon and with respect to the shaft and with respect to each other, and have their opposing faces made hollow to house said bevel pinions, said gears being internally in mesh with said pinions. Spur gear 5 is the smaller one of two spur gears and is in constant mesh with another spur gear 10 which is keyed upon the counter shaft 11 which is axially movable within the bearings 12 and 13 in which it also rotates. The larger spur gear 9 is in constant mesh with spur gear 14 which is fast upon another counter shaft 15 which is axially movable in the bearings 16, 17 in which it also rotates. The two counter shafts 11 and 15 are thus driven at speeds which bear a compensating relation by the functioning of the differential 7, any increase in the speed of either counter shaft resulting in the decrease in the speed of the other counter shaft and vice versa.

Spur gear 18 is keyed upon shaft 11 and is integral with a spur pinion 19 that is in mesh with a spur gear 20 which drives the spur pinion 21 in a forward direction through a clutch 22. The latter spur pinion is in mesh with a spur gear 23 which turns loosely upon counter shaft 11. The latter spur gear turning at a rate, due to the illustrated selected ratios of the other gear elements in train therewith, which is a little more than one fifth as fast as gear 18. Spur pinion 24 is of the diameter of pinion 21, these two pinions being fixed upon the same shaft 26 which is journalled in the bearings 27, 28 and upon which spur gear 20 loosely turns. One member of the clutch 22 turns with the gear 20 and the complemental member turns with the pinion 21. A spring 29 yieldingly maintains the clutch members together, and permits slippage when the driving clutch member has its direction of rotation reversed. Pinion 24 is in mesh with spur gear 30 which, in turn, is in mesh with spur gear 31 that turns loosely upon shaft 11 at the same rate as but opposite to spur gear 23. Spur gear 30 turns upon a shaft that has bearings 32, 32'.

Spur gear 14, driven by spur gear 9, is fixed upon shaft 15 and drives spur gear 33 through a clutch 34 that has one member fixed upon the former gear and a complemental member fixed upon the latter gear. A spring 35 yieldingly maintains these clutch members together, and permits slippage when the driving clutch member has its direction of rotation reversed. The spur gear 33 is integral with a spur pinion 36 that is in mesh with a spur gear 37 which drives spur gear 38 in a forward direction through the intermediation of a clutch 39 which has one member integral with gear 37 and another member integral with gear 38 that is mesh with spur gear 38' which turns loosely upon shaft 15. A spring 40 yieldingly maintains these clutch members together and permits slippage when the driving clutch member has its direction reversed. Spur gear 41 is of the same size as gear 38 and is fixed upon the shaft 42 therewith, this shaft being supported upon bearings 43, 43', the gear 37 turning loosely upon this shaft. The gear 41 is in mesh with spur gear 44 whose shaft is within the bearings 45, 46. The gear 44 is in mesh with a spur gear 47 that turns loosely upon shaft 15, the speeds of these two gears being the same while their directions are opposite. Springs 48, 49 that are relatively strong and weak respectively, press upon the spur gear 47 respectively to the right and left.

Assuming that the differential pinions are operating as a solid unit and that the gear ratios are as illustrated and described the rates and ratios of revolution of the different gears for each revolution of the driving shaft 1 are as follows:—

On shaft 11,

Gear  8 : Gear 10 =  1R : 1.5R
Gear 10 = 1.      5R
Gear 19 : Gear 20 = 13R : 6R
Gear 21 : Gear 23 = 13R : 6R
Gear 23 : Gear 18 = $\frac{6R \times 6R}{1.5R \quad 13R}$ : −.213 : 1
Gear 23 = .32R
Gear 31 = .32R;

On shaft 15,

Gear  9 : Gear 14 = 1R : 2.3R
Gear 33 = 2.3R
Gear 36 : Gear 37 = 2R : 1R
Gear 38 : Gear 38' = 7R : 5R
Gear 38': Gear 33 = $\frac{5R}{7R} \times \frac{1R}{2R} = 3.6 : 1$
Gear 38' = .83R
Gear 47 = .83R The speed rates of the gears 33, 18, 38', 23, 31 and 47 are, therefore, in terms of the speed rate of the drive shaft at unity, 2.3R, 1.5R, .83R, .32R and −.83 respectively.

The shafts 11 and 15 are capable of a slight longitudinal movement but are normally retained in their regular positions by the springs 50, 50'. By means of the lever 51, and the yokes 52, 52, which fit into the collars 53, 53, a movement of one shaft in one longitudinal direction will result in a movement of the other shaft in the opposite direction. Upon the sides of gears 10 and 14 which are keyed to the shafts are friction disks 54, 55, which, by the movement of the shaft, may be brought into contact with the stationary friction disks 56, 57 respectively.

Gear 58 is shown as being twice the diameter of gears 18, 23, 31, 33, 38', 47; it is capable of sliding longitudinally upon the load shaft 4 upon which it is splined.

Gear 58 may be moved along the shaft 4 by means of the collar 59, into which fits a yoke 60, which is controlled from a cross head 61 which is in turn controlled by the lever 67 through the link 63.

The operation of the mechanism is described as follows: When the gear 58 is in a position half way between gear 23 and gear 31 it is entirely disconnected from the drive shaft 1, and is in "neutral." As gear 58 is moved forward toward the differential 6, 7, 8, 9, it first engages the gear 23 and if the drive shaft is rotating and there is a load upon the propeller shaft 4, the gear 58 will remain unmoved, for the gear 8 of the differential will tend to remain stationary while gear 9 through the action of the conical gears 7,7 will tend to rotate at twice the speed of the differential spider 6 which is driven by the drive shaft 1 and through the action of gear 9 the train of gears on shaft 15 will rotate at twice their normal speed.

As gear 58 is moved further to the right the teeth of the gear 58 which are beveled at the end for ease of connection, (Fig. 5) rub against the teeth of gear 38', also beveled at the end, and this will result in the following events: (a) the slowing down of gear 38' due to the friction of the teeth with gear 58; (b) the pushing of the shaft 15 to the right carrying with it the friction disk 55 which comes into contact with the friction disk 57; (c) the action of the yoke arm 51 to prevent the shaft 11 from being pushed to the right by the friction between the teeth of gears 58 and 23, thus preventing friction between the disks 54 and 56; (d) the slowing of the shaft 15 by the slight friction of the teeth of gear 38' with those of gear 58, and the much greater slowing action due to the friction of the disks 55 and 57 will result, by means of the differential, in the motion of the gears of shaft 11; (e) the friction of gear 58 with the moving gear 38' will tend to set gear 58 into motion; (f) the motion of the gears on shaft 11 of which gear 23 is one will also tend to set gear 58 into motion. As the speed of gear 23 is increased due to the increased friction on shaft 15 gear 58 with which gear 23 engages will also be increased in rate; (g) the teeth of gear 58 will finally move at the same rate as those of gear 38' when, of course, the two gears will readily engage; then (h) the spring 50 will force shaft 11 back into its original position and the friction disks 54 and 57 will separate. When gear 58 is engaging gear 38' and also gear 23, as in the dotted position in Figure 1, the gear 58, which is twice as large as gears 23 and 38', will rotate at a rate one half the average of the "normal" rates of gears 23 and 38', or at .28 the rate of the drive shaft 1. By "normal" rate is here meant the rates under the condition that the differential is revolving as a unit.

To change to intermediate speed the gear 58 is moved from the dotted position toward the right until its teeth begin to rub those of gear 18 which is going at a faster rate than gears 23 or 38'. The friction of the teeth of gear 58 with those of gear 18 will tend to slow down the rate of shaft 11 and consequently, through the action of the differential, to increase the rate of shaft 15; the pressure toward the right upon gear 18 will move shaft 11 toward the right and cause the friction disks on that side to engage while at the same time the action of the lever 51 prevents the smaller amount of friction between gears 58 and 38' from carrying shaft 15 to the right and producing friction between discs 55 and 57. The friction and slowing of shaft 11 will increase the rate of shaft 15 and consequently of gear 58 which is engaged with gear 38' and the two will engage. But while shaft 15 and gear 58 have been increasing in rate, the shaft 11 has been decreasing in rate, yet the gears 58 and 23 have remained engaged: to permit this, the clutch 22 enables gears 23 and 21 to turn at a rate faster than that at which they would normally be driven by the gears 19, 20. When the gear 58 first completely engages gear 18, gears 18 and 23 will necessarily be turning at the same rate of speed and this will continue until gear 58 has been moved far enough to the right to disengage the teeth of gear 23. The position in which gear 58 engages equally gears 23 and 38' and is driven at a rate one half the average normal rates of gears 23 and 38', i. e. at a rate .58 that of the drive shaft, is the intermediate speed.

The same process that occurs in changing from the drive by gears 23 and 38' to gears 38' and 18 takes place in changing from gears 38' and 18 to gears 18 and 33. The position between 18 and 33 is the first position of the high speed, and in this position gear 58 is driven at a rate .95 that of the drive shaft 1. As gear 58 is moved still further to the right lugs 64, 64 on the gear wheel 58 engage with similar lugs 65, 65 on the end of the drive shaft 1 and the propeller shaft 4 will be increased from a speed of .95R to a speed of 1R, this being permitted by the action of the ratchet 34. Gear 58 is then pushed still further to the right, completely disengaging gear 18 and permitting the whole gear shifting mechanism to idle while the propeller shaft and the drive shaft are coupled as a single unit; this is the second position of high speed.

To go from high speed to neutral the process is reversed: the beveled ends of the teeth of gears 58, 18, 23, 31, 33, 38', 47, diagrammatically illustrated in Fig. 5, permit ready meshing of the gears in the reverse movement, even when the car is standing still. The teeth on the side of gear 58 away from the differential and the teeth of 23 and 38' on the side toward the differential are beveled to slant only in one direction to prevent the engagement of teeth of gear 23, when moving gear 58 toward the left, in such a manner as to force it in a backward direction relative to gear 18, a motion which would not be permitted by the action of the ratchet 22. The same holds true for the beveling of the teeth of gear 23. Further, the action of the ratchets or clutches will permit the change from high speed to intermediate speed, to low speed and to neutral while the load shaft is going at a high rate of speed without any corresponding racing of the engine.

To go from neutral into reverse the gear 58 is thrown into mesh with gear 31 and then the gear 47, just as was true of the movement into 23 and 38' when going from neutral into low. The action of the friction disk 48 permits the same sort of slowing of the faster gear and speeding of the slower gear which took place when changing speeds in a forward direction.

Changes may be made without departing from my invention.

Having thus described my invention I claim:—

1. The combination with a driving shaft; of two gears rotatable with respect to each other and with respect to said shaft; gearing driven by said shaft and constituting a differential coupling with aforesaid gears in mesh therewith; two countershafts driven, respectively, by the aforesaid two gears; two gears, one on each countershaft; a load shaft; and a gear turning with and movable along the load shaft to be brought into and out of engagement with the latter two gears and with which it is adapted to have simultaneous engagement.

2. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; and a gear turning with and movable along the load shaft to be brought into and out of engagement with the latter two gears and with which it is adapted to have simultaneous engagement, one of said counter shafts being longitudinally movable; and a friction device into and out of connection with which this counter shaft is brought as it is moved longitudinally.

3. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; and a gear turning with and movable along the load shaft to be brought into and out of engagement with the latter two gears and with which it is adapted to have simultaneous engagement, each of said counter shafts being longitudinally movable; and a friction device individual to each counter shaft and into and out of connection with which such shaft is brough as it is moved longitudinally.

4. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; and a gear turning with and movable along the load shaft to be brought into and out of engagement with the latter two gears and with which it is adapted to have simultaneous engagement, each of said counter shafts being longitudinally movable; and a friction device individual to each counter shaft and into and out of connection with which such shaft is brought as it is moved longitudinally; and mechanism common to both counter shafts for moving them longitudinally and serving to move each into connection with the friction device individual thereto while moving the other out of connection with the friction device individual thereto.

5. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; and a spring for moving counter shaft out of connection with said friction device.

6. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; and two springs, each individual to a counter shaft and serving to disconnect such shaft from the friction device individual thereto.

7. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; and two springs, each individual to a counter shaft and serving to disconnect such shaft from the friction device individual thereto.

8. The combination with a driving shaft; of two gears rotatable with respect to each other and with respect to said shaft; gearing driven by said shaft and constituting a differential coupling with aforesaid gears in mesh therewith; two countershafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon one of said counter shafts; gearing driven by this second gear and driving the other gear upon this shaft at a different speed from this second gear, the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

9. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a second gear upon one of said counter shafts; gearing driven by this second gear and driving the other gear upon this shaft at a different speed from this second gear, the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

10. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; a second gear upon one of said counter shafts; gearing driven by this second gear and driving the other gear upon this shaft at a different speed from this second gear, the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

11. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon one of said counter shafts; gearing driven by this second gear and driving the other gear upon this shaft at a different speed from this second gear; the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

12. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon one of said counter shafts; gearing driven by this second gear and driving the other gear upon this shaft at a different speed from this second gear; the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

13. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon one of said counter shaft; gearing driven by this second gear and driving the other gear upon this shaft at a different speed from this second gear; the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

14. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon one of said counter shafts; gearing driven by this second gear and driving the other gear upon this shaft at a different speed from this second gear, the gear upon the load shaft being simultaneously engageable with the two gears upon the latter counter shaft and the gear upon the other counter shaft; and a clutch included in the gearing driven by said second gear to permit this second gear to turn at the same rate with the other gear upon the same counter shaft therewith.

15. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

16. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

17. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

18. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

19. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon one of said counter shafts; and gearing driven by this second gear and driving the other gear upon this shaft at a different speed from this second gear, the gear upon the load shaft being simultaneously engageable with the second gear upon the latter countershaft and the gear upon the other counter shaft.

20. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

21. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

22. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon each of said counter shafts; gearing driven by this second gear and driving the other gear upon this shaft at a different speed from this second gear, the gear upon the load shaft being simultaneously engageable with the two gears upon each countershaft and the first gear upon the other counter shaft; and clutch included in the gearing driven by each second gear to permit this second gear to turn at the same rate with the other gear upon the same counter shaft therewith.

23. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

24. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

25. The combination with a driving shaft; of two gears rotatable with respect to each other with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

26. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

27. The combination with a driving shaft; of two gears rotatable with respect to each other and with respect to said shaft; gearing driven by said shaft and constituting a differentail coupling with aforesaid gears in mesh therewith; two counter shafts driven, respectively, by the aforesaid two gears; two gears, one on each counter shaft; a load shaft, a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

28. The combination with a driving shaft; of two gears rotatable with respect to each other and with respect to said shaft; gearing driven by said shaft and constituting a differential coupling with aforesaid gears to mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

29. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon each of said counter shafts; and gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

30. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears with which it is adapted to have simultaneous engagement, one of said counter shafts being longitudinally movable; a friction device into and out of connection with which this counter shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; and a clutch included in the gearing driven by each second gear to permit this second gear to turn at the same rate with the other gear upon the same counter shaft therewith.

31. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneously engagement, each of said counter shafts being longitudinally movable; a friction device individual to each counter shaft and into and out of connection with which such shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft; and a clutch included in the gearing driven by each second gear to permit this second gear to turn at the same rate with the other gear upon the same counter shaft therewith.

32. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

33. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears, two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon one of said counter shafts; and gearing driven by this second gear and driving the other gear upon this shaft at a different speed from this second gear, the gear upon the load shaft being simultaneously engageable with the second gear upon the latter countershaft and the gear upon the other counter shaft.

34. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

35. The combination with a driving shaft; of two gears rotatable with respect to each other and with respect to said shafts; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft.

36. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon each of said counter shafts; gearing driven by this second gear and driving the other gear upon this shaft at a different speed from this second gear; the gear upon the load shaft being simultaneously engageable with the two gears upon each counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

37. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

38. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each countershaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; a second gear upon each of said counter shafts; gearing driven by this second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

39. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

40. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon each of said counter shafts; gearing driven by this second gear and driving the other gear upon the shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

41. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

42. The combination with a driving shaft; of two gears rotatable with respect to each other and with respect to said shafts; gearing driven by said shaft and constituting a differential coupling with aforesaid gears to mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

43. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement; a second gear upon each of said counter shafts; and gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

44. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears with which it is adapted to have simultaneous engagement, one of said counter shafts being longitudinally movable; a friction device into and out of connection with which this counter shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft and the first gear upon the other counter shaft; a clutch included in the gearing driven by each second gear to permit this second gear to turn at the same rate with the other gear upon the same counter shaft therewith; and a slippage clutch through which one of the two gears first mentioned drives the second gear upon one of the counter shafts.

45. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the lead shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; a second gear upon each of said counter shafts; gearing driven by this second gear and driving the other gear upon this shaft at a different speed from this second gear, the gear upon the load shaft being simultaneously engageable with the two gears upon each latter counter shaft; a clutch included in the gearing driven by each second gear to permit the second gear to turn at the same rate with the other gear upon the same counter shaft therewith; and a slippage clutch through which one of the two gears first mentioned drives the second gear upon one of the counter shafts.

46. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; a second gear upon one of said counter shafts; and gearing driven by this second gear and driving the other gear upon this shaft at a different speed from this second gear, the gear upon the load shaft being simultaneously engageable with the second gear upon the latter counter shaft and the gear upon the other counter shaft; and a slippage clutch through which one of the two gears first mentioned drives the second gear upon one of the counter shafts.

47. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, one of said counter shafts being longitudinally movable; a friction device into and out of connection with which this counter shaft is brought as it is moved longitudinally; a spring for moving said counter shaft out of connection with said friction device; a second gear upon one of said counter shafts; gearing driven by this second gear and driving the other gear upon this shaft at a different speed from this second gear, the gear upon the load shaft being simultaneously engageable with the second gear upon the latter counter shaft and the gear upon the other counter shaft; and a slippage clutch through one of the two gears first mentioned drives the second gear upon one of the counter shafts.

48. The combination with a driving shaft; of two gears rotatable with respect to each other and with respect to said shaft; gearing driven by said shaft and constituting a differential coupling with aforesaid gears to mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; two springs, each individual to a counter shaft and serving to disconnect such shaft from the friction device individual thereto; a second gear upon one of said counter shafts; gearing driven by this second gear and driving the other gear upon this shaft at a different speed from this second gear, the gear upon the load shaft being simultaneously engageable with the second gear upon the latter counter shaft and the gear upon the other counter shaft; and a slippage clutch through one of the two gears first mentioned drives the second gear upon one of the counter shafts.

49. The combination with a driving shaft; of two gears rotatable with respect to each other and with respect to said shaft; gearing driven by said shaft and constituting a differential coupling with aforesaid gears in mesh therewith; two counter shafts driven, respectively, by the aforesaid two gears; two gears, one on each counter shaft; a load shaft; a gear turning with and movable along the load shaft to be brought into and out of engagement with the latter two gears and with which it is adapted to have simultaneous engagement, each of said counter shafts being longitudinally movable; a friction device individual to each counter shaft and into and out of connection with which such shaft is brought as it is moved longitudinally; mechanism common to both counter shafts for moving them longitudinally and serving to move each into connection with the friction device individual thereto while moving the other out of connection with the friction device individual thereto; two springs, each individual to a counter shaft and serving to disconnect such shaft from the friction device individual thereto; a second gear upon one of said counter shafts; gearing driven by this second gear and driving the other gear upon this shaft at a different speed from this second gear, the gear upon the load shaft being simultaneously engageable with the second gear upon the latter counter shaft and the gear upon the other counter shaft; and a slippage clutch through which one of the two gears first mentioned drives the second gear upon one of the counter shafts.

50. The combination with a drive shaft; of a load shaft; two rotatable gears; gearing in connection with one of said shafts and in mesh with said gears and constituting therewith a differential coupling; and an additional gear in connection with the other of said shafts and connectible with each of said two gears severally and together.

51. The combination with a drive shaft; of a load shaft; two rotatable gears; gearing in connection with one of said shafts and in mesh with said gears and constituting therewith a differential coupling; an additional gear; and means for connecting the additional gear with one of the first aforesaid gears severally and with both of the first aforesaid gears together.

52. The combination with a drive shaft; of a load shaft; two rotatable gears; gearing in connection with one of said shafts and in mesh with said gears and constituting therewith a differential coupling; an additional gear in connection with the other of said shafts and connectible with each of said two gears severally and together; and friction means for checking the rotation of either of the first aforesaid two gears when said additional gear is connected with the other of the first aforesaid gears.

53. The combination with a drive shaft; of a load shaft; two rotatable gears; gearing in connection with one of said shafts and in mesh with said gears and constituting therewith a differential coupling; an additional gear; means for connecting the additional gear with one of the first aforesaid gears severally and with both of the first aforesaid gears together; and friction means for checking the rotation of the other of the first aforesaid gears when the one is severally connected with said additional gear.

54. The combination with a drive shaft; of a load shaft; two rotatable gears; gearing in connection with one of said shafts and in mesh with said gears and constituting therewith a differential coupling; an additional gear; means for connecting the additional gear with one of the first aforesaid gears severally and with both of the first aforesaid gears together, said connecting means including two connected gears, one in connection with one of the first aforesaid gears and the other in separable connection with said additional gear; a slippage clutch; and a gear connected with the latter of said connected gears through said clutch and differing in speed therefrom, said additional gear being simultaneously connectible with that one of the aforesaid connected gears that is connected with the additional gear and the gear that is brought into connection by said clutch.

In witness whereof, I hereunto subscribe my name.

CHESTER W. DARROW.